United States Patent Office 3,128,259
Patented Apr. 7, 1964

3,128,259
SYNTHETIC RESINS CONTAINING PHENOLIC HYDROXYL GROUPS
Lawrence F. Sonnabend, Midland, Mich., assignor to The Dow Chemical Company, Midland, Mich., a corporation of Delaware
No Drawing. Filed Aug. 3, 1959, Ser. No. 831,002
3 Claims. (Cl. 260—18)

The present invention relates to new and useful resinous materials and more particularly concerns a class of new and useful copolymers having the following probable characteristic general formula H—A—CH$_2$—B—CH$_2$(A—CH$_2$—B—CH$_2$)$_n$A—H wherein —A— represents a divalent aromatic radical of the benzene series wherein each benzene ring bears a phenolic hydroxyl group and wherein the two valences are in positions ortho or para to said hydroxyl group, $n$ represents an integer from 1 to 6, inclusive; and, wherein B represents the internal radical of an aromatic chloromethylated compound. The radical B can be represented as a member selected from the group consisting of divalent radicals having the formula

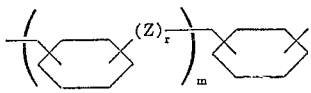

wherein Z represents oxygen, alkylidene, or —SO$_2$—, $r$ represents an integer of from 0 to 1, inclusive and $m$ represents an integer from 0 to 5, inclusive.

These new resinous copolymers are useful in the preparation of polyhydric alcohols by reaction with aliphatic and aromatic oxide such as for example, alkylene oxides or styrene oxide, which alcohols are adapted to be esterified with unsaturated long-chain fatty acids to prepare novolak-type drying-oil esters to prepare varnishes or as ingredients in paints and varnishes and impart to the finished product an alkali resistance; for reaction with formaldehyde-furnishing compounds such as hexamethylene tetramine, formaldehyde and paraformaldehyde to prepare thermoset resins; and for reaction with polybasic acids to form alkyd resins. These and other obvious uses will become apparent to those skilled in the art to which the present invention pertains from the following specification and claims.

The novel copolymers of the present invention conveniently can be prepared by reacting a hydroxylated aromatic compound of the class hereafter defined with a bis- or poly(chloromethyl) aromatic compound at a temperature of from about 50° C. to about 150° C. until the evolution of hydrogen chloride has substantially ceased. The ratio of reactants is not critical, some of the desired product being produced with any ratio. However, when less than stoichiometric quantities of either component are employed, the terminal moiety of the copolymer will be that moiety resulting from the component employed in excess. It is preferable in most instances to employ an excess of the hydroxylated aromatic compound since a more desirable compound is obtained when the terminal moieties contain the aromatic hydroxyl group. Good yields of the desired product are obtained when the hydroxylated aromatic reactant is employed in at least a slight excess over stoichiometric quantities. However, the hydroxylated reactant may be employed in from .8 to 10 moles per mole of chloromethylated compound. Upon completion of the reaction, the unreacted reactants are removed by conventional means such as distillation under reduced pressure, or the like.

The hydroxylated aromatic compounds which can be used as starting materials are those phenolic compounds which have at least two hydrogen atoms on the aromatic nucleus in positions activated by the phenolic hydroxyl group and are free of substituents other than halogen, alkyl or aryl. Such aromatic compounds include the halophenols, such as phenol, orthochlorophenol, metachlorophenol, dichlorophenol, trichlorophenol; the alkylphenols, such as ethylphenol, octylphenol, p-tert.-butylphenol; the cycloaliphatic phenols such as cyclohexylphenol; the cresols, such as o-cresol, p-cresol, m-cresol; the bisphenols, such as diphenol, Bisphenol A, Bisphenol B, bis(p-hydroxyphenyl)methane, bis(o-hydroxyphenyl)methane, 2,2-bis(dichloro-p-hydroxyphenyl)propane, and the like, and the diphenyl ethers such as bis(p-hydroxyphenyl) ether and the like, and the nuclear mono, di and polyhalogenated, alkylated and arylated derivatives thereof.

The chloromethylated aromatic compounds which can be employed in accordance with the present invention are for example, the bis(chloromethyl) benzenes including the nuclear halo-, alkyl-, alkyloxy-, and aryl-substituted compounds; the bis(chloromethylphenyl) compounds such as bis(chloromethyl) biphenyl, bis(chloromethylphenyl) oxide, bis(chloromethylphenyl) alkanes, including the nuclear halo-, alkyl-, alkoxy-, and aryl substituted compounds.

The following examples are illustrative of the present invention but are not to be construed as limiting.

Example 1

940 grams (10 moles) of phenol was heated to 100° C. and 266 grams (1 mole) of 4,4′-bis(chloromethylphenyl) oxide was added with stirring over 10 minutes. The reaction was very fast.

Phenol was stripped off under vacuum with the final conditions being 190–200° C. at 2.5 cm. Hg for one hour. There was obtained as a result of these operations 365 grams of a light yellow resin having a Durran melting point of 55° C.

Example 2

282 grams of phenol (3 moles) was heated to 60° C. and 642 grams (2.4 moles) of 4,4′-bis(chloromethylphenyl) oxide dissolved in 700 grams of toluene was added slowly over 1 hour and 45 minutes with stirring while maintaining the system at 60–80° C.

The volatiles were stripped off with final condition being 200° C. at 2.5 cm. Hg to obtain 726 grams of a resinous material having a melting point 127.5° C. and containing only .01 percent chlorine by analysis.

Example 3

352.5 grams of phenol (3.75 moles) was heated to 70° C. and 667.5 grams (2.5 moles) of 4,4′-bis(chloromethylphenyl) oxide dissolved in 612 grams of toluene was added over 1.5 hours with stirring. During the addition the reaction mixture was maintained at 70–80° C. with external cooling. The volatiles were removed under vacuum with final conditions being 180–182° C. at 2.5 cm. Hg for 30 minutes to obtain 790 grams of a resinous material having a melting point 90.5° C. and a chlorine content of .01 percent.

Example 4

400 grams of the product of Example 3, 200 gm. of methyl ethyl ketone and 5.5 ml. of triethylamine was placed in a stainless steel bomb. The bomb was heated to 137° C. and 153 gm. of propylene oxide was added over 16 minutes. After about two hours reaction period the system was cooled, the contents of the bomb were transferred to a resin flask and stripped of volatiles to yield 494 grams of a resinous material having a Durran melting point of 88.2° C. This product is useful in preparing alkyd, epoxy and varnish resin composition.

Example 5

200 grams of the product of Example 4, 117 gm. of dehydrated castor oil fatty acids and 5 ml. of toluene were charged into a one-liter flask equipped with agitator, thermometer, condenser and water trap. The system was heated at 240° C. for four hours after which time the acid number of the varnish was 8, indicating that the esterification reaction was essentially complete. This varnish had exceptional alkali resistance.

Example 6

189.5 grams of the product of Example 3 was dissolved in 600 gm. of toluene and 10.5 gm. of hexamethylenetetramine and 200 grams of wood flour were added. The mixture was dried in a vacuum for 18 hours at 60–70° C. The dry powder was molded at 150° C. and about 4800 p.s.i.

A commercially available phenol-formaldehyde resin was mixed with hexamethylenetetramine and wood flour and molded in the foregoing manner. Comparison of the two resins were made by boiling 2 x ½ x ⅛ inch test strips cut from each of the moldings in normal sodium hydroxide. Results of these tests are in the following table.

| No. | Exposure | Time in Hours | Percent Change in Wt. | Appearance and Remarks |
|---|---|---|---|---|
| 6A | N/1 NaOH | 4 | | Sample had began to swell—surface very rough. |
|  | N/1 NaOH | 30 | +59 | Severely swollen—sample had cracked. |
|  | N/1 NaOH | 96 | +73.7 | Severely cracked and swollen—very dark color. |
| 6B | N/1 NaOH | 4 | | Very slight blemish on surface. |
|  | N/1 NaOH | 30 | +31 | Slight swollen—very light blemish. |
|  | N/1 NaOH | 96 | +30 | Slight swollen—sample still in good condition. |

Sample Identification: 6A—Phenol-formaldehyde resin; 6B—Phenol-chloromethylated DPO resin.

Example 7

108 grams (1 mole) of p-cresol was heated to 76° C. and 187 grams (.665 mole) of 4,4'-bis(chloromethylphenyl) oxide in 200 grams of toluene was added over a 50-minute period with stirring while maintaining the temperature at about 75° C. The volatiles were stripped off under vacuum with final conditions being 190° C. at 2 cm. Hg to yield 238.4 grams of a resinous material.

Example 8

257 grams (2 moles) of o-chlorophenol was heated to 77° C. and 187 grams (.665 mole) of 4,4'-bis(chloromethylphenyl) oxide was added over a 65-minute period with stirring and cooling to maintain the temperature at 75° C. for 22 hours. The volatiles were stripped off under vacuum with final conditions being 198° C. at 28.5 inch, gauge, vacuum to yield 251 grams of a resinous material having a Durran melting point of 70.7° C.

Example 9

235 grams (2.5 moles) of phenol was heated to 80° C. and 212 grams of mixed (chloromethylphenyl) oxides (70% bis- and 30% tris-chloromethyl diphenyl oxides) in 100 grams of toluene was added over a 2 hour and 20 minute period with stirring. Temperature of the system was raised to 150° C. over a period of 2 hours and 20 minutes. Thereafter vacuum was applied and the excess phenol stripped off, final conditions being 185° C. at 4 cm. Hg, to obtain 271 grams of a resinous product.

Example 10

188 grams (2 moles) of phenol was heated to 80° C. and 233 grams (1.33 moles) of α,α'-dichloro-p-xylene was added over about 2 hours while holding the system at a temperature of 80–100° C. The temperature was raised to about 100 to 130° C., for an additional 2 hours and 30 minutes. Excess phenol was stripped off under vacuum with final conditions being 180° C. at 2 cm. Hg to yield 280 grams of a light colored thermoplastic resin having a Durran melting point of 106° C.

I claim:

1. A resin containing phenolic hydroxyl groups, said resin being produced by the reaction of, as sole essential reactants, (A), at least two nuclear hydrogens, activated by a phenolic hydroxyl, of a hydroxylated aryl compound having the formula

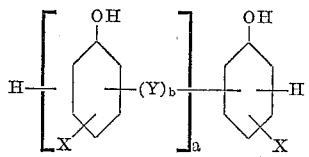

wherein X represents a radical selected from the group consisting of hydrogen, halogen, alkyl, cycloalkyl and aryl; Y represents a radical selected from the group consisting of alkylidene and oxygen; b represents an integer from 0 to 1; a represents an integer from 0 to 1; with (B) a chloromethylated aromatic compound having the formula

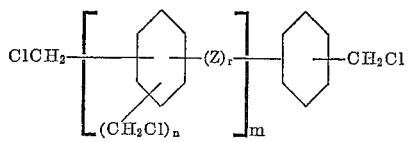

wherein Z represents a member selected from the group consisting of oxygen, alkylidene, and $SO_2$; r represents an integer from 0 to 1; m represents an integer from 0 to 5; n represents an integer from 0 to 1; and mixtures thereof at a temperature of from about 50° to 150° C., for between about ¼ to 4 hours.

2. A resinous composition comprising an alkylene oxide adduct of the product of claim 1 formed by reacting the product of claim 1 with an alkylene oxide having from 2 to 4 carbon atoms, said reaction being effected by heating the reactants in the presence of a basic catalyst and an inert organic solvent.

3. A varnish which comprises a long chain fatty acid ester of the product of claim 2.

References Cited in the file of this patent

UNITED STATES PATENTS

| 2,060,715 | Arvin | Nov. 10, 1936 |
| 2,542,111 | Bloch | Feb. 20, 1951 |

FOREIGN PATENTS

| 220,985 | Great Britain | Aug. 25, 1924 |
| 433,452 | Great Britain | Aug. 12, 1935 |
| 355,389 | Germany | June 26, 1922 |
| 526,361 | Germany | June 5, 1931 |

UNITED STATES PATENT OFFICE
CERTIFICATE OF CORRECTION

Patent No. 3,128,259                             April 7, 1964

Lawrence F. Sonnabend

It is hereby certified that error appears in the above numbered patent requiring correction and that the said Letters Patent should read as corrected below.

Column 4, line 66, for "526,361" read -- 526,391 --.

Signed and sealed this 10th day of November 1964.

(SEAL)
Attest:

ERNEST W. SWIDER                                  EDWARD J. BRENNER
Attesting Officer                                      Commissioner of Patents